July 25, 1967  R. PARRETT, JR  3,332,164
COMPACT SNELLED FLY CARRIER
Filed April 21, 1965  2 Sheets-Sheet 1
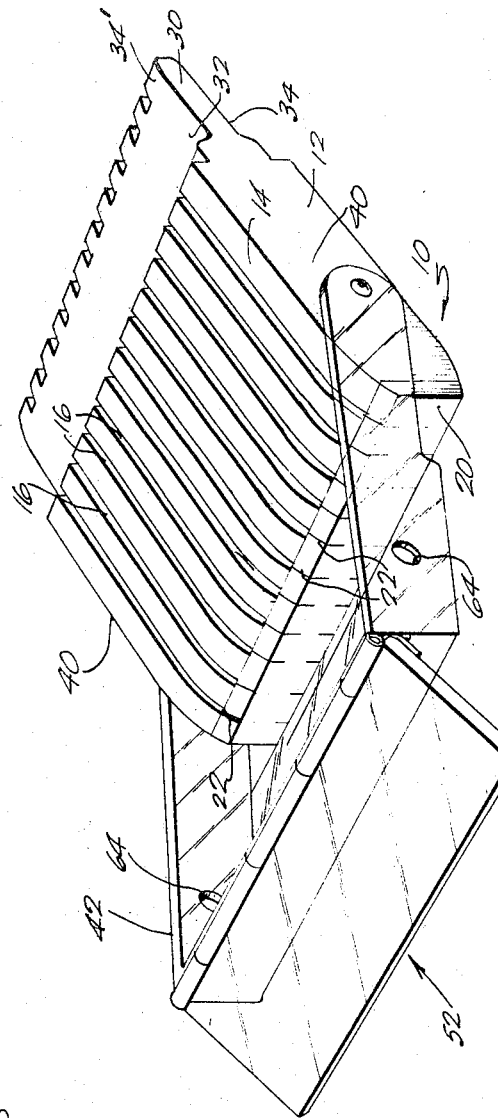
INVENTOR.
ROY PARRETT, Jr.
BY
Victor J. Evans & Co.
Attorneys

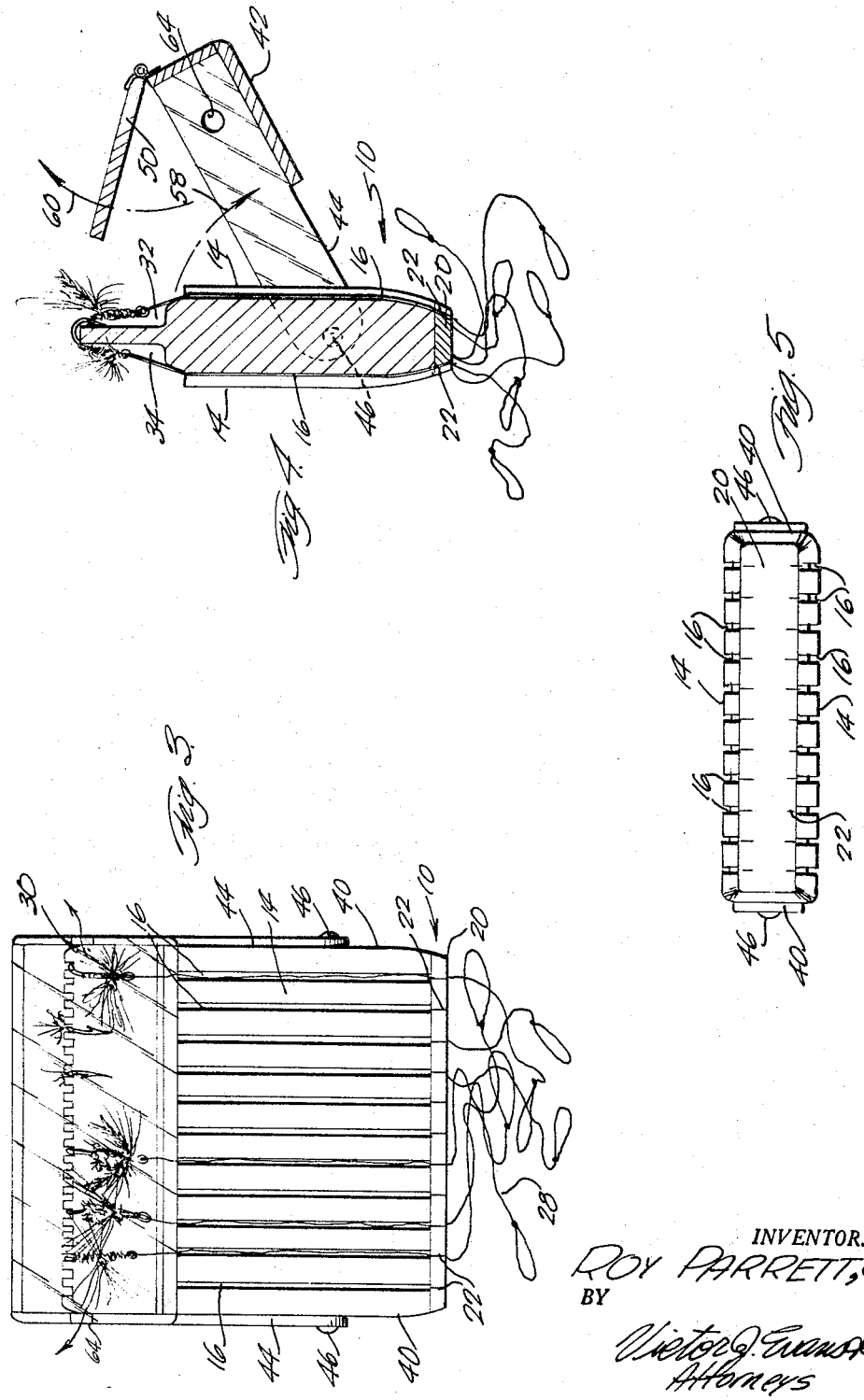

United States Patent Office 3,332,164
Patented July 25, 1967

3,332,164
COMPACT SNELLED FLY CARRIER
Roy Parrett, Jr., R.F.D. 1, Branch,
Butte, Mont. 59701
Filed Apr. 21, 1965, Ser. No. 449,846
3 Claims. (Cl. 43—57.5)

ABSTRACT OF THE DISCLOSURE

An improved compact snelled hook fly carrier adapted to be operated by one hand in such event that the other hand is occupied with positioning a fishing line or other attending apparatus, and which provides for the accommodation of the hooks and snells therefor and a plastic box pivotally mounted upon the carrier having a hinged flap to provide access to the flies as well as to make it possible for the entire device to be carried in one's pocket and without entanglement with or damage to clothing.

The present invention relates to an improved compact snelled fly carrier, and more particularly relates to an improved compact snelled fly carrier adapted to be manipulated by one hand in the event the other hand is occupied with positioning a fish line or other attending apparatus.

It is within the purview of the present invention to provide a new and compact fly carrier in which the apparatus contains a base having a series of arcuately contoured slots therein, a resilient material on one end of said slots for engaging and securely retaining fish lines therein as applied thereto, and in which the other ends of said line contain a hook or snelled fly adapted to be mounted on a carrier means having a serrated or cut engaging portion for receiving the hooks or the snelled flies, and in which a recess between said base and said serrated edges is provided to dispose a space for mounting such hooks and flies. Further, the invention seeks to provide a pivotally mounted plastic box mounted from other edges of said base and forming a receptacle which includes a hinged flap member for pivotally cooperating and disassociating also the fly mounting carrier means from within said receptacle so that they may be removed, examined, and positioned on said fly mounting carrier means as well as extending the leadline or fish line along said fish line receiving recess of said base and retaining said line within the resilient material mounted on the opposite end of said base thereof.

An object, therefore, of the present invention is to provide a new and improved compact snelled fly carrier of the construction adapted to be manually manipulated by one hand with a degree of facility, and in which the carrier is disposed to be carried in one's pocket without causing the flies or hooks disposed on said carrier to engage the clothing or be damaged by providing protection thereof by a pivotally mounted plastic box that is mounted from said base.

Another object of the invention is to provide a pivotal arrangement and closure so that the snelled hook after being placed in position in the carrier may be housed to prevent injury as well as to dry the fly, if a dry fly, for future use.

The above and other objects and advantages of the invention will become apparent upon full consideration of the following detailed description and accompanying drawings in which:

FIGURE 1 is a perspective view showing the compact snelled fly carrier having a pivotal plastic box and open-hinged flap, in accordance with a preferred embodiment of the invention;

FIGURE 2 is a side view of the fly carrier shown in FIGURE 1, in which the pivotally mounted plastic box is shown in a closed position with said hinged flap;

FIGURE 3 is a plan elevational view taken from the left side of FIGURE 2;

FIGURE 4 is a cross-sectional view taken along one of the recesses of the base, and in which the receptacle is being disengaged pivotally from the fly container portion thereof; and FIGURE 5 is an end view showing the resilient material used to mount the ends of the fish line, in accordance with the preferred embodiment of the invention.

Referring now to the drawings, there is shown a compact snelled fly carrier 10 having a base 12 constructed of wood or other similar type material in which there are provided opposite surfaces 14, 14 that are slightly arcuately contoured with respect to a mid-line along said base, said contoured surface being disposed to have a series of parallel fish line or leader-end receiving recesses 16, 16, 16 disposed to extend across the contoured surfaces 14, 14, respectively. Along one edge of said base and engaging the end of a series of said parallel recesses, there is a sheet or layer of resilient material 20, such as rubber or other elastomeric material, mounted along the edge of said base, and in which there is provided a series of small slits 22, 22, each being in substantial alignment with the corresponding recess 16, 16, so that the ends of the fish line or leader 28 may be positioned therein for forming a securing means for the end of said lines as they are applied and pulled therethrough. On the opposite end of said base, there is an extension or fly mounting carrier means 30 extending integrally from said base and also constructed of wood or like material for forming fly-receiving recesses 32, 34, as particularly shown in FIGURES 1, 2 and 4.

The fly-receiving recesses are formed between an edge of said surface 14, and a portion 34' for mounting the fly on said carrier. The portion 34' contains a series of cut portions resembling a serrated edge for firmly assuring positioning of the flies on said portion 34', so that the flies are mounted on the fly-mounting carrier means, as shown in FIGURES 2, 3 and 4.

Along opposite and alternative edges 40, 40 of said base, there is mounted a pivotally arranged plastic box 42 having pivotal arms 44, 44, and mounted by pivot means or pins 46, 46. As is shown in FIGURE 2, there is a hinge 48 for providing a hinged flap 50 which cooperates with the box 42 in forming a receptacle 52, as shown in FIGURE 1, for entirely encompassing and compactly enclosing the flies mounted on the portion 34'. As is shown in FIGURE 4 by the arrow 58, the box 42 is removed from enclosing the flies and hooks mounted on the portion 34' when displaced in accordance with the direction of the arrow 58, and in which the hinged flap 50 is similarly displaced in accordance with the direction of the arrow 60, as can be readily imagined in accordance with the illustrations shown in FIGURES 1 and 4.

In opposite ends of the box 42, there is a small opening or air hole 64, 64 provided for venting the moisture that may be collected on the fly. When a fly has been placed on the fly mounting carrier means and within the receptacle or recess 32, the moisture that may have collected on the fly may evaporate and the moist air is vented through the holes 64, 64. In this way, the fly is dried and is ready for future use.

In accordance with the present invention, the fly or hook sought to be stored in the carrier is first hung or disposed on the serrated portion 34' when the carrier is in the open position, as shown in FIGURES 1 and 4, and then the line attached to said hook or fly is drawn through a given recess 16 in alignment with the mounting on said serrated portion 34', until the line, such as line 28, is drawn through the resilient holding material 20 and is tightly drawn through the slit 22 that is in alignment with the recess 16. The end of the line 28 is seen to be free of the carrier and, as desired, the box 42 is closed upon said base 12 so that the hooks and flies mounted therein are protected upon the flap 50 being closed thereover.

Having thus completely and fully described all of the features of the invention according to the preferred embodiment it will be understood that the invention is susceptible to modifications, alterations and variations without departing from the clear spirit and teaching of the invention. The invention, therefore, includes all modifications, alterations, and variations as come within the purview of the following claims.

What is claimed is:

1. A compact snelled fly carrier comprising a wood base having the surface thereof slightly arcuately contoured and having parallel fish line receiving recesses disposed to extend along and across said surface, a resilient material mounted along an edge of said base containing said recesses and said material having small slits for receiving and securing therein ends of said line, a hook fly mounting carrier means extending integrally from the other end of said base from said resilient material and forming a fly-receiving recess between the adjacent edge of said base and the portion for mounting the fly on said carrier means, said fly mounting carrier means having serrated edges for assuring positioning of the fly on said portion for mounting the fly on said carrier, a plastic box forming means pivotally mounted from other edges of said base and forming a receptacle having a hinged flap for cooperating with said base to completely and compactly enclose the flies mounted therein.

2. The invention according to claim 1 wherein the side arms of said plastic box engage opposite surfaces of said base and in which the pivotal plastic box is pivotally removed from said fly mounting carrier means upon significantly and substantially opening said hinged flap of said receptacle.

3. The invention according to claim 1 wherein a series of holes are mounted in said receptacle for allowing moist air to vent therefrom for drying the flies mounted therein.

References Cited

UNITED STATES PATENTS

| | | | |
|---|---|---|---|
| 2,080,794 | 5/1937 | Squassoni | 43—57.5 |
| 2,431,821 | 12/1947 | Murph | 43—57.5 |
| 2,447,105 | 8/1948 | Vogel | 43—57.5 |

SAMUEL KOREN, *Primary Examiner.*

D. J. LEACH, *Assistant Examiner.*